May 26, 1959  K. CALDWELL  2,888,082
STONE PICKER RAKE
Filed Nov. 23, 1955

Inventor
KENNETH CALDWELL
by
W. Irwin Hackett
Attorney

United States Patent Office 2,888,082
Patented May 26, 1959

2,888,082

STONE PICKER RAKE

Kenneth Caldwell, Shanty Bay, Ontario, Canada

Application November 23, 1955, Serial No. 548,740

2 Claims. (Cl. 171—63)

This invention relates to improvements in a stone picker and appertains particularly to the rake thereof.

In mechanical stone pickers, one of the problems most frequently encountered is the clogging or jambing of the rake by stones and debris wedging between the teeth. Resort has been had to employing a blade extending the full width of the rake to which blade the front end of all the teeth connect but this has the effect of causing the rake to dig, increasing the draft load and of making the rake into a solid unit that is difficult to repair and impossible to adjust as regards the coarseness of the rake.

It is the object of this invention to provide a stone picker rake of generally improved structure especially as regards the form of the rake assembly to allow of easy and rapid application or removal of individual teeth for replacement, repair, or to rearrange the spacing thereof when desired to vary the coarseness of the rake.

A further object of the invention is to provide a stone picker rake having teeth of novel design to prevent the clogging of the rake by stones and the like wedging between the teeth.

A further object of the invention is to provide a stone picker rake having teeth with especially rugged, long-lasting leading ends for efficiently travelling over the earth, engaging and lifting stones onto the rake for subsequent depositing in the stone collecting box.

A still further object is the provision of a stone picker rake and special tooth element therefor of the nature and for the purpose specified that is characterized by structural simplicity, ease of employment and low cost of production and installation, whereby the same is rendered commercially desirable.

To the accomplishment of these and related objects as shall become apparent as the description proceeds, the invention resides in the construction, combination and arrangement of parts shall be hereinafter more fully described, illustrated in the accompanying drawings, and pointed out in the claims hereunto appended.

The invention will be best understood and can be more clearly described when reference is had to the drawings forming a part of this disclosure wherein like characters indicate like parts throughout the several views.

Fgure 5 is a similarly enlarged side elevation of the leading end of the tooth.

This improved rake is suitable for use with my tractor operated stone picker disclosed in United States Patent No. 2,706,877 issued April 26, 1955, and other stone pickers similarly employing a forwardly extending, downwardly inclined rake disposed transversely of the machine's line of draft. In my mentioned stone picker the teeth are attached to a transverse angle iron at their upper ends and are connected in spaced parallel relation intermediate their ends to a second transverse angle iron or other crossbar. The rake is mounted on the machine to pivot on or in the area of the upper transverse member and is dumped by lifting on the rake at opposite sides at or near the said second transverse member. Accordingly the rake assembly shown herein conforms to these requirements but may undergo minor variations in design to meet the needs of other gathering implements.

In its preferred embodiment, the rake comprises two transversely disposed frame members and a plurality of spaced, parallel teeth mounted therein. These transverse members may be of angle bar form, the upper transverse bar being designated 10 and the lower bar 11. Each is of a length corresponding with the overall width of the rake and is provided with a row of perforations 12, suitably spaced as in groups of four running the full length of one arm of each angle bar. This rake may be pivotally connected at or by the ends of the upper angle bar 10 to the implement and for dumping may be raised by links that connect to the opposite ends of the lower angle bar 11.

Figure 1:
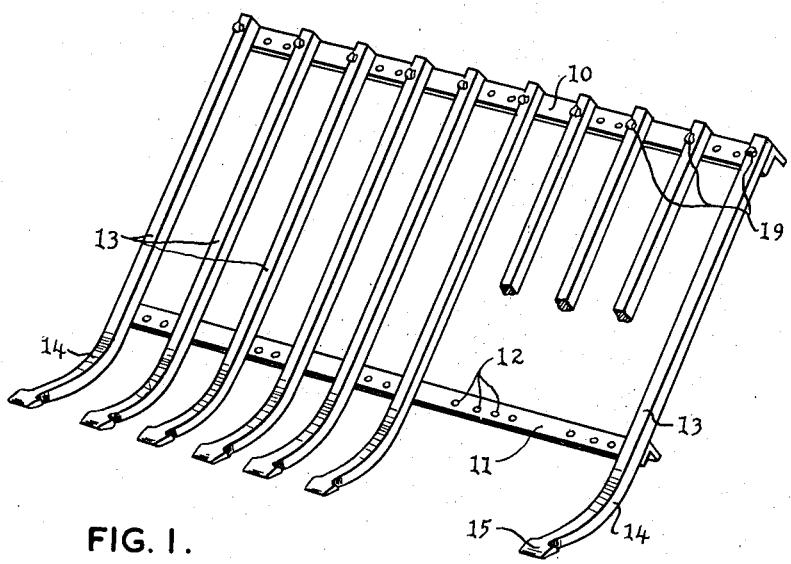
Figure 1 is a perspective view of an assembled stone picker rake constructed in accordance with my invention.
Figure 2:
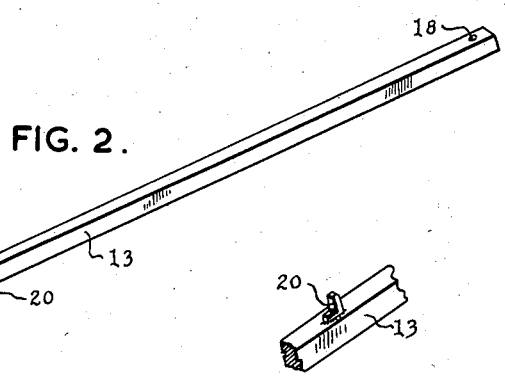
Figure 2 is an enlarged perspective view of one of the teeth thereof.
Figure 4:
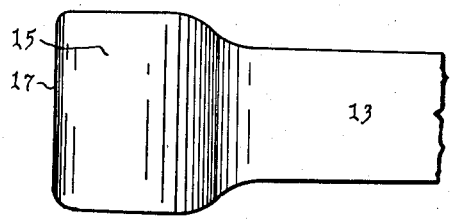
Figure 4 is an enlarged plan view of the leadng end of a tooth.
Figure 5:
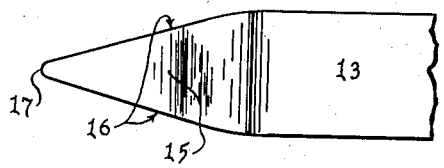

The special teeth for connection to the rake's transverse angle bars will be seen to comprise an elongated steel rod 13 approximately one inch square in cross section with an arcuate or upwardly curved front end 14. The leading end 15 is widened approximately 25% to 50%, as shown clearly in Figures 2 and 4, for a distance running back from the end of at least one inch and preferably more, with the widening extending out equally on both sides to an overall width of from one and a quarter to one and a half inches for substantially the full length of such widening so that in plan view the tooth end is of generally rectangular form. This widened, leading end of the tooth is also tapered vertically, by bevelled surfaces 16 on both upper and lower sides, as shown in Figures 2 and 5, to a blunt pont or leading edge 17 that is preferably rounded as clearly illustrated in the latter mentioned figure. The distance that the widening is carried in from the end is important with relation to the greater width of such widened end but more especally with regard to the distance that the tapering bevels extend rearwardly—the widening preferably continuing beyond the inner end of the taper. The size of the tooth may be changed as needed but these carefully set forth proportions of the nose are important and should not be greatly varied. This specific nose structure allows the rake to move with relative ease over the surface of the ground because of the upwardly turned front end and the bevel on the underside of the blunt edged widened nose; to pick up stones with minimum effort because of the blunt edge and inclined upper surface of the widened nose; and to raise onto the body of the rake only such litter, trash or stones as are too large to fall through or wedge in the spaces between the teeth on account of the widened noses first engaging such stones etc., being more narrowly spaced from each other than the elongated bodies of the teeth to the rear thereof. The blunt end, the taper on both upper and lower sides, the substantial thickness of the nose and the carrying of the extra width back for a considerable distance from the point all combine to render this tooth nose highly efficient and durable in use.

Figure 3:
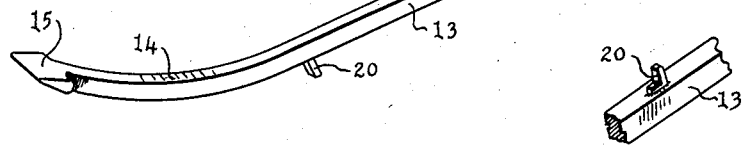
Figure 3 is a perspective detail of the under side of the tooth, showing a fastening device thereon.

To facilitate the rapid and easy variation of the coarseness of the rake, as is necessary when larger or smaller stones are to be gathered, the upper end of each tooth 13 is provided with a bore 18 through from top to bottom for reception of a bolt 19 by which it may be connected to the rake's upper angle bar 10, but for connection with the lower angle bar 11 a small steel finger 20, projecting from the under side of the tooth, intermediate its ends but nearer the curved front end, may be used. This finger, shown in Figure 3 as of angle form and square in cross section and welded on the back of the tooth 13, is driven into the selected perforation in the transverse angle bar 11 in tight driving fit and can be bent or riveted slightly where it projects back of the bar. Since the pressure is all on the front of the rake tooth the finger 20 is subjected to little strain and provides an easily separable connection when the removal of the tooth is desired.

From the foregoing description taken in connection with the accompanying drawings, it will be manifest that a stone picker rake is provided that will fulfil all the necessary requirements of such a device, but as many changes could be made in the above description and many apparently widely different embodiments of the invention may be constructed within the scope of the appended claims, without departing from the spirit or scope thereof, it is intended that all matters contained in the said accompanying specification and drawings shall be interpreted as illustrative and not in a limitative or restrictive sense.

Having thus described the invention, what is claimed as new is:

1. For a stone picker rake, a removable tooth having an elongated stem approximately square in cross section and rounded upwardly at one end, said end tapering vertically with bevelled surfaces on both upper and lower sides and terminating in a dull rounded edge, said end being approximately 25% to 50% wider than the stem of the tooth for substantially the full length of the taper.

2. For a stone picker rake, a tooth having an elongated stem that is rectangular in cross section and rounded upwardly at the one end, said end having upper and lower sides with a bevel on both said upper and lower sides tapering vertically to a blunt rounded edge and having up to approximately one-half greater width than the stem of the tooth, such widened portion of said end being substantially rectangular in plan view and extending in from the end of the tooth for approximately the length of said bevels.

References Cited in the file of this patent

UNITED STATES PATENTS

| | | |
|---|---|---|
| 1,843,205 | Clark | Feb. 2, 1932 |
| 2,317,932 | Moore | Apr. 27, 1943 |
| 2,491,208 | Price et al. | Dec. 13, 1949 |
| 2,504,459 | Schneider et al. | Apr. 18, 1950 |
| 2,712,280 | Peoples | July 5, 1955 |